United States Patent [19]

Isogai

[11] Patent Number: 5,236,065

[45] Date of Patent: Aug. 17, 1993

[54] LIFT USED FOR MAINTENANCE OF VEHICLES

[75] Inventor: Shunji Isogai, Hekinan, Japan

[73] Assignee: Sugiyasu Industries Co., Ltd., Takahama, Japan

[21] Appl. No.: 870,046

[22] Filed: Apr. 16, 1992

[30] Foreign Application Priority Data

| Apr. 18, 1991 | [JP] | Japan | 3-35710 |
| May 30, 1991 | [JP] | Japan | 3-48731 |
| May 30, 1991 | [JP] | Japan | 3-48732 |
| Jun. 20, 1991 | [JP] | Japan | 3-55760 |

[51] Int. Cl.$^5$ .......................................... B60S 13/00
[52] U.S. Cl. .................... 187/8.41; 187/8.67; 187/8.77
[58] Field of Search ............... 187/8.41, 8.65, 8.67, 187/8.74, 8.75, 8.77; 254/2 R, 9 R, 3 R, 89 H

[56] References Cited

U.S. PATENT DOCUMENTS

| 2,857,985 | 10/1958 | Simmons, Sr. | 187/9 R |
| 3,271,006 | 9/1966 | Brown et al. | 187/8.67 |
| 3,415,342 | 12/1968 | Hott | 187/8.41 |
| 4,267,901 | 5/1981 | Tsujimura | 187/8.67 |
| 4,506,866 | 3/1985 | Horn | 254/2 B |
| 4,694,674 | 9/1987 | Lawrence | 187/8.41 |
| 4,984,657 | 1/1991 | Burns | 187/8.67 |

Primary Examiner—Robert P. Olszewski
Assistant Examiner—Kenneth Noland
Attorney, Agent, or Firm—Lahive & Cockfield

[57] ABSTRACT

The invention provides a movable one-post lift used for maintenance of a vehicle including: a base with transport wheels which are drawn up to and taken out of the base; an upright support post mounted on the rear end of the base; a driving mechanism disposed in the support post; a cantilever beam ascending and descending along the support post by the driving mechanism; a pair of parallel drive-on-plates fixed to the cantilever beam for supporting the body of the vehicle; and a stopper attached to a suitable position of the base for fixing the base at a predetermined location on the floor. This structure allows efficient car maintenance in a limited space as well as smooth transport and space-saving storage of the lift. The lift also includes riding plates which are connected to both ends of the drive-on-plate and pivotally moved downward when the drive-on-plate is lifted up from the floor level. This mechanism ensures an effective length of the drive-on-plate sufficient for securely supporting the body of a vehicle without preventing smooth detachment of wheels from the body.

12 Claims, 14 Drawing Sheets (A)

(B)

LIFT USED FOR MAINTENANCE OF VEHICLES

BACKGROUND OF THE INVENTION

The present invention relates to a lift used for maintenance of vehicles, which includes an elevation mechanism for ascending and descending between a floor level and a predetermined height and a drive-on-plate for supporting the body of a mounted vehicle. More specifically, the invention pertains to a movable one-post lift which can be used in a narrow space.

Several types of stationary and movable lifts with a drive-on-plate have been proposed for maintenance of vehicles. Commonly used one-post lifts, which support the load with a single beam, are stationary type and fixed to the floor with anchor bolts. Movable lifts are, however, favorably applied to simple maintenance facilities in tire stands and car parts dealers or temporary maintenance facilities.

One example of such movable lifts is disclosed in Japanese Patent Publication Gazette No. Sho-46-9015, including: a support post mounted on one end of a base with transport wheels; a cantilever beam with a pair of vehicle supports which is thrust under a vehicle and lifts and lowers the body of the vehicle along the support post by an elevation mechanism. Here one of the vehicle supports on the cantilever beam may be slidable as shown in FIG. 16 to adjust the distance between the supports.

In this example, the cantilever beam is horizontally thrust under a stationary vehicle, and a free space corresponding to the length of the cantilever beam sufficient for supporting a mounted vehicle, that is, movable space of the cantilever beam, is thereby required on the vehicle side. Accordingly the movable lifts of such structure are not practically used in narrow garages and limited spaces. Furthermore the long cantilever beam hinders smooth transport and storage of the movable lift.

In the lift with the adjusting mechanism, the vehicle support is slidable only when the cantilever beam is placed over the base to avoid undesirable contact of the drive-on-plate with the base. The adjusting mechanism may also cause rattling and squeaking. Another disadvantage of this example is its troublesome operation; that is, a vehicle should be fixed to the lift with the cantilever beam placed under the vehicle.

In another prior art structure disclosed in Japanese Patent Publication Gazette No. Sho-56-4480, transport wheels are protrudent from the bottom of a base only by a small length to improve stability in stationary conditions. This system, however, does not attain sufficient stableness in lift-up position nor ensure smooth movement of the lift on a rough floor surface. The wheels are disposed on front and rear ends of the base to make the radius of gyration undesirably large.

In a conventional structure, a vehicle is lifted up with all the wheels placed on the drive-on-plate. Free wheel structure is, however, typically applied, in which wheels of the vehicle are not mounted on the drive-on-plate but are maintained at predetermined positions over the drive-on-plate, thereby being freely detachable, while the body of the vehicle is securely supported. Since the drive-on-plate is higher by its thickness than the floor level, a riding plate or plates are generally used for easy riding of wheels on or over the drive-on-plate. The riding plate may detachably be arranged or be fixed to both ends of the drive-on-plate in alignment.

Detachable riding plates 23 shown in FIG. 15A are placed next to a drive-on-plate 15(16) every time when a vehicle M is mounted on the lift, and are cleared away after the vehicle M is lifted up. When riding plates 23 are fixed to the drive-on-plate 15(16) in free wheel structure as shown in FIG. 15B, on the other hand, the plates 23 may prevent smooth detachment of wheels 25 of the vehicle M. Accordingly, an effective length L2 of the drive-on-plate 15(16) directly in contact with the body of the vehicle M is determined to be small.

SUMMARY OF THE INVENTION

A general object of the invention is thus to provide a lift of free wheel structure used for maintenance of vehicles.

A specific object of the invention is to provide a movable one-post lift which requires only a small space in use and in storage.

A further specific object of the invention is to provide a lift with a drive-on-plate of an effective length sufficient for securely supporting the body of a vehicle without preventing smooth detachment of wheels from the body.

A lift used for maintenance of a vehicle is provided with an elevation mechanism for ascending and descending between a floor level and a predetermined height, and a drive-on-plate for supporting the body of a vehicle.

More specifically, a movable one-post lift according to the invention includes: a base with transport wheels which are drawn up to and taken out of the base; an upright support post mounted on the rear end of the base; a driving mechanism disposed in the support post; a cantilever beam ascending and descending along the support post by the driving mechanism; and a drive-on-plate fixed to the cantilever beam for supporting the body of a vehicle.

The drive-on-plate may include front and rear plates which are arranged in parallel with each other and perpendicular to the cantilever beam. Here the length of each drive-on-plate is adjustable. The front plate is connected to the cantilever beam to form the shape of a letter T and is foldable over the cantilever beam.

The movable one-post lift also includes a stopper attached to a suitable position of the base for fixing the base at a predetermined location on the floor.

The lift with the cantilever beam at its lowest position is transported to any desirable location for maintenance of a vehicle. After the lift is fixed to a predetermined position on the floor with the stopper, a vehicle is mounted on the drive-on-plate and lifted up to a desirable height. With this structure of the lift, efficient and safe car maintenance is performed even in narrow spaces like garages for personal use. In storage, the drive-on-plate is folded up to save the space.

In a preferred structure of the invention, a movable one-post lift includes: an upright support post mounted on the rear end of a base; a driving mechanism disposed in the support post; a cantilever beam ascending and descending along the support post by the driving mechanism; a drive-on-plate fixed to the cantilever beam for supporting the body of a vehicle; a pair of horizontally rotatable driving wheels disposed on the center of the rear end of the base; a hydraulic elevation mechanism directly connected to the driving wheels; and a pair of driven wheels disposed on the approximate center of the base. The driving wheel and the driven wheel are linked to each other.

This structure allows the lift to rotate around the center located in the middle of the driven wheels on the base, thus enhancing the stability and attaining the small radius of gyration between the rotation center and the driving wheels. The driven wheels are drawn up to bring the base into contact with the floor when a vehicle is run on the drive-on-plate. With this mechanism, efficient and safe car maintenance is performed even in narrow spaces like garages for personal use. The driven wheels are taken out and protrudent to maintain the distance between the base and the floor when the lift is transported.

The lift also includes riding plates which are connected to both ends of the drive-on-plate and pivotally moved downward when the drive-on-plate is lifted up from the floor level.

The drive-on-plate is moved down to its lowest position, where a vehicle runs on the plate and stops at a certain position with front wheels passing over the plate. When the drive-on-plate is lifted up to a desirable length, the riding plates pivotably move downward not to prevent smooth detachment of wheels from the body. In this structure, the drive-on-plate can be extended to the span between the front and rear wheels of the vehicle.

The above and further objects and features of the invention will more fully be apparent from the following detailed description with accompanying drawings.

DESCRIPTION OF THE PREFERRED EMBODIMENTS

A movable one-post lift for maintenance of vehicles embodying the invention is described in detail according to the drawings.

Figure 1:
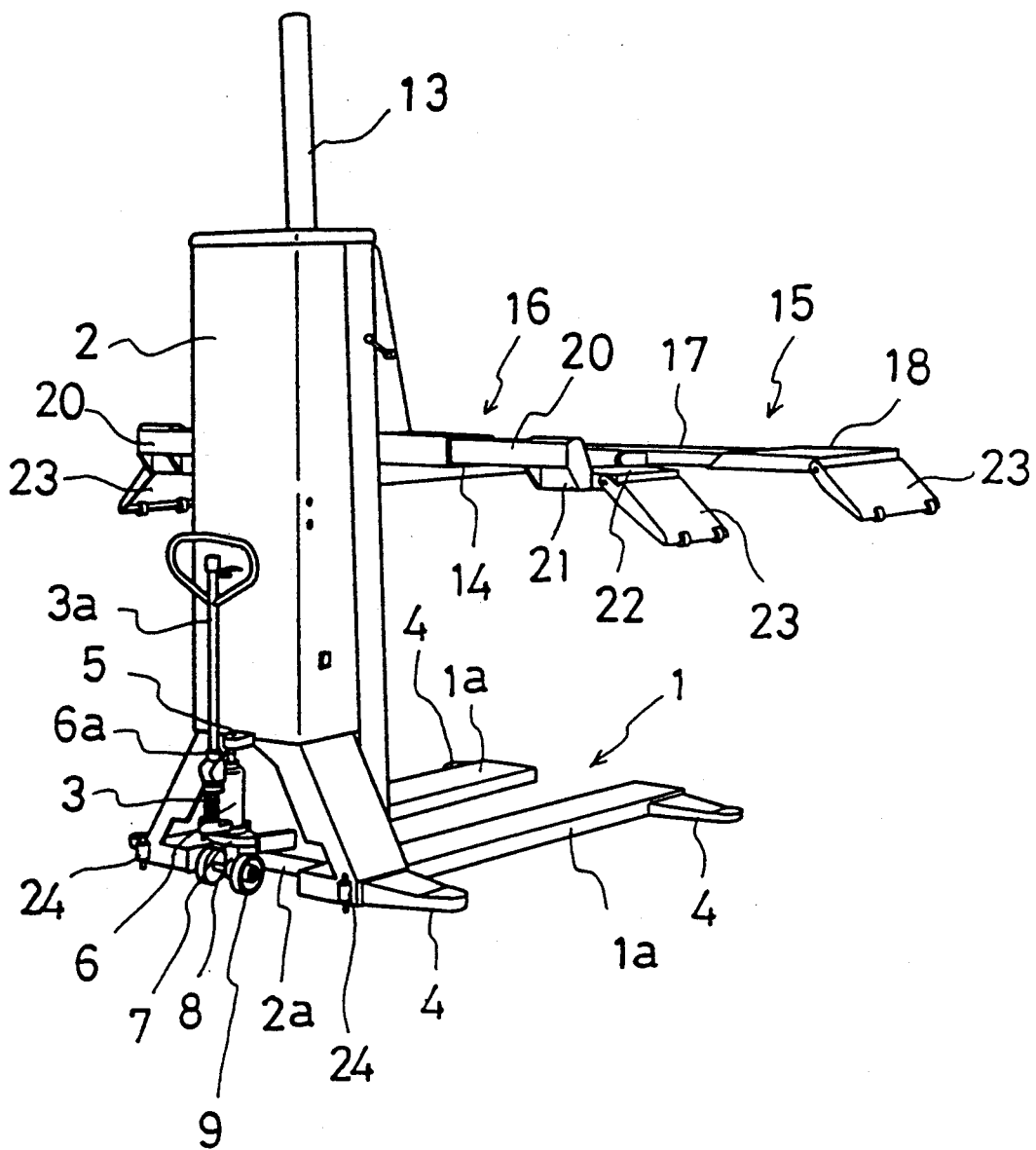
FIG. 1 is a perspective rear view showing a preferred embodiment of the invention, a movable one-post lift used for maintenance of vehicles, including a horizontally extended drive-on-plate lifted up to a predetermined height.
Figure 2:
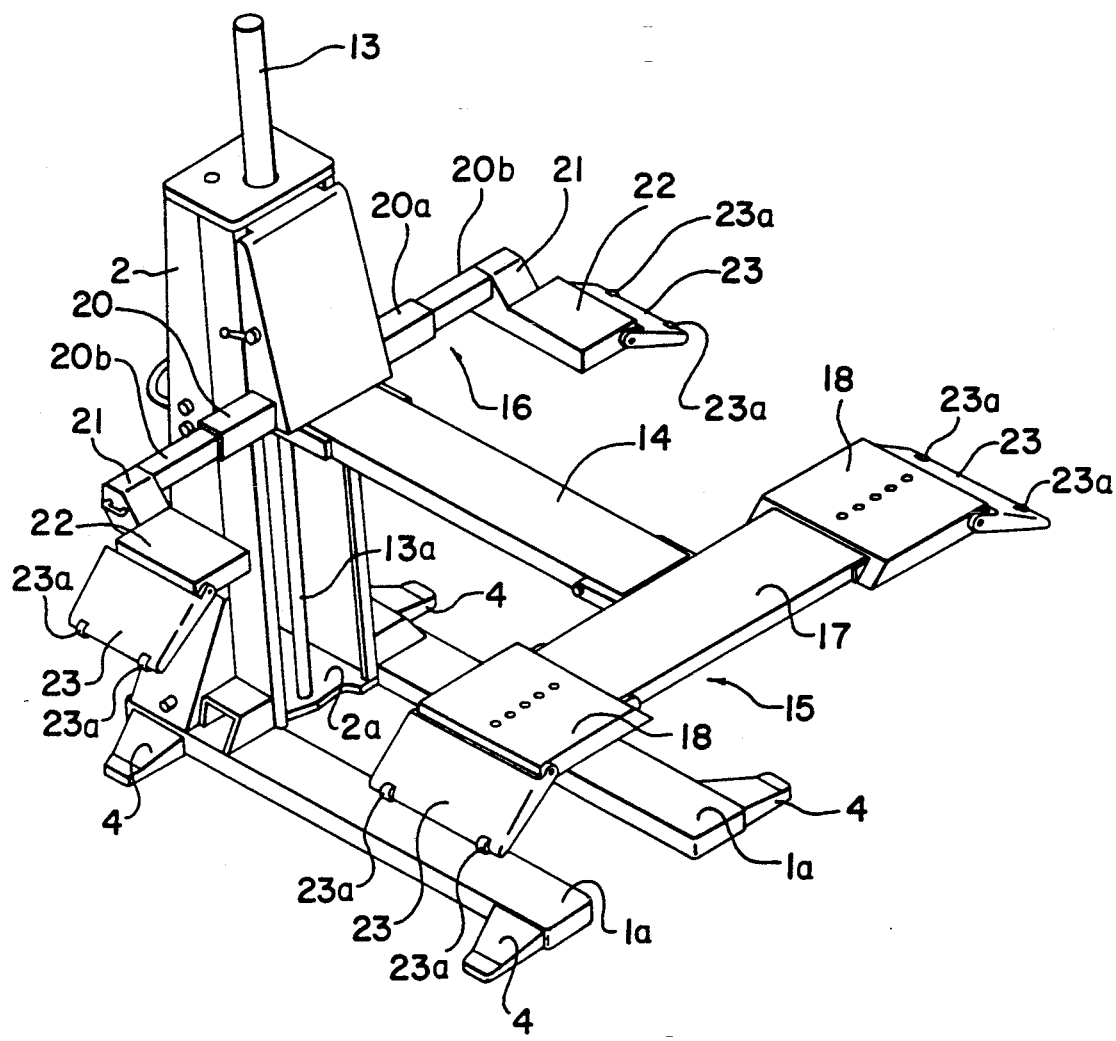
FIG. 2 is a perspective front view showing the movable one-post lift of FIG. 1.
Figure 3:
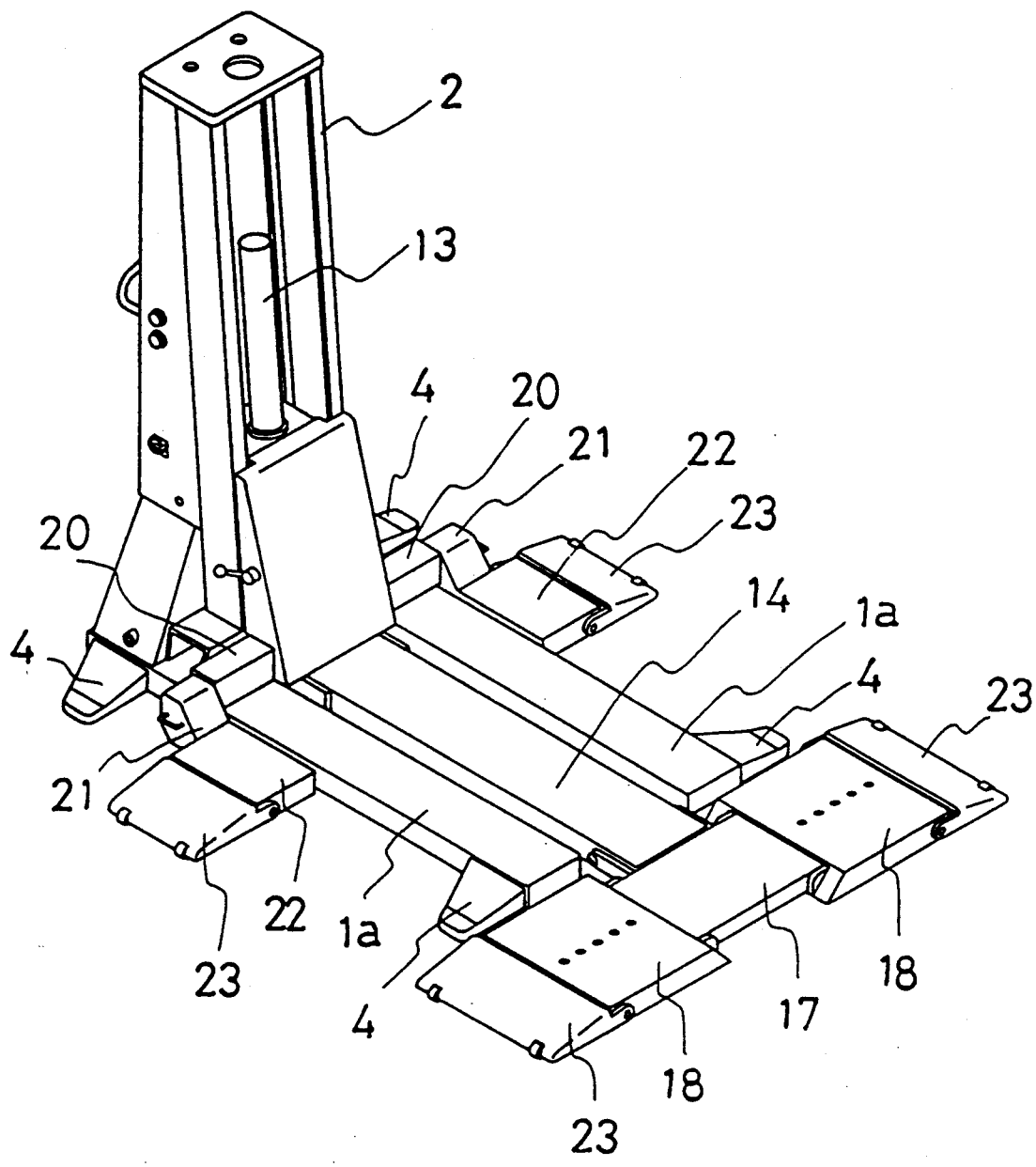
FIG. 3 is a perspective front view showing the one-post lift of FIG. 2 with the contracted drive-on-plate lowered to the floor level.
Figure 9:
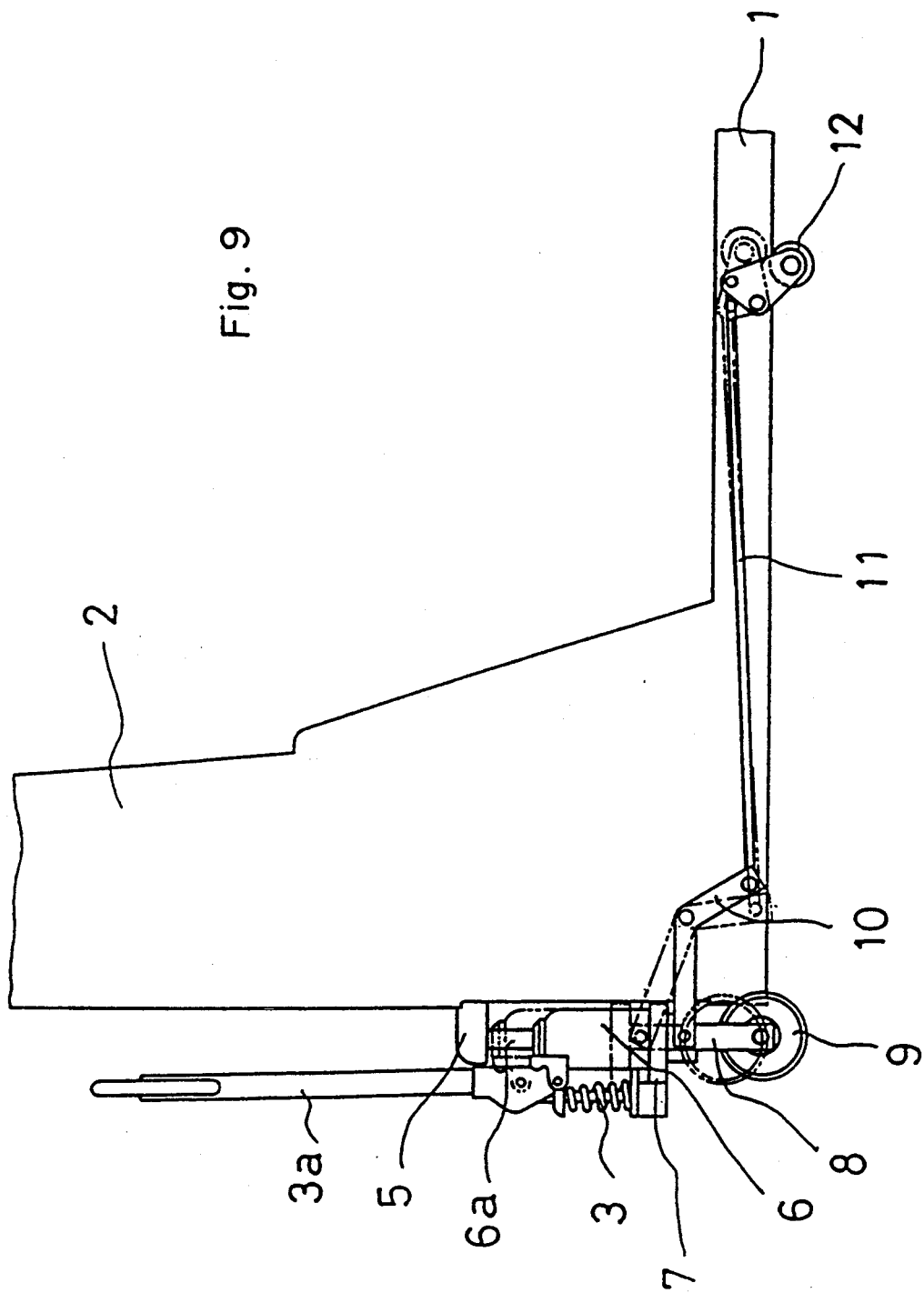
FIG. 9 is a side view showing a mechanism of transport wheels drawn up to and taken out of the base.

As shown in FIGS. 1, 2, and 3, an upright support post 2 is fixed to the rear end of a base 1, and a manual hydraulic pump 3 with a pumping handle 3a is further disposed behind the support post 2. The base 1 includes a pair of base plates 1a,1a which extend in parallel from the front to the rear end and are connected to each other via a bottom plate 2a of the support post 2. Trapezoid feet 4,4 are attached to both ends of the base plates 1a, 1a. A cylinder support 5 is projected from the rear face of the support post 2. A short stroke cylinder unit 6 is disposed under the cylinder support 5 with a piston rod 6a of the cylinder unit 6 facing upward and being in contact with the support 5. The lower portion of the cylinder unit 6 is provided with a stand 7 on which the hydraulic pump 3 is mounted in parallel with the cylinder unit 6. The hydraulic pump 3 and the cylinder unit 6 are connected to each other via an oil path formed in the stand 7. A pair of transport wheels or driving wheels 9,9 are rotatably mounted on the lower end of a cylinder foot 8 projected downward from the stand 7. When the pumping handle 3a of the hydraulic pump 3 is operated, operating fluid is fed into the cylinder unit 6. Here the piston rod 6a is pressed upward, and in response to the movement of the piston rod 6a, the driving wheels 9 are pressed lower than the base level as seen in FIG. 9. The driving wheels 9 are drawn up as expressed by the doted line of FIG. 9 when hydraulic pressure is released. Another pair of transport wheels or driven wheels 12,12 are mounted on the approximate center of the base plates 1a,1a each via a link 10 and an operation rod 11. The driven wheels 12,12 are drawn up to and taken out of the base 1 in conjunction with the movement of the driving wheels 9,9. The driven wheels 12,12 are located on the approximate center of the lift, thus reducing the radius of gyration in transportation.

Figure 6:
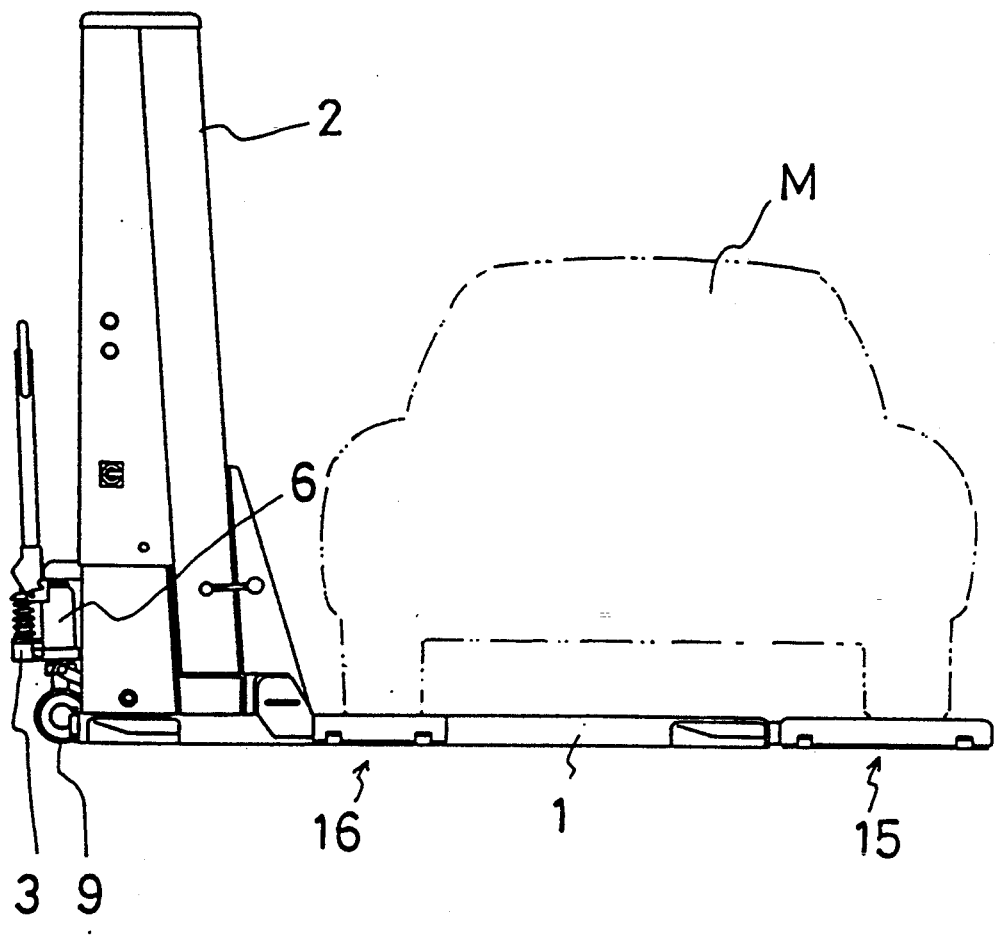
FIG. 6 is a front view illustrating the one-post lift of the invention with the drive-on-plate at its lowest position.

A cylinder unit 13 for driving a cantilever beam 14 is stored in the support post 2 with a piston rod 13a of the cylinder unit 13 facing downward. The lower end of the piston rod 13a is half fixed to the bottom plate 2a of the support post 2. An oil path is formed in the piston rod 13a, and operating fluid fed from a hydraulic unit (not shown) mounted beside the support post ×2 runs through the oil path to a chamber of the cylinder unit 13. The cantilever beam 14 projected forward in substantially horizontal direction is attached to the support post 2 via a ram of the cylinder unit 13, and moves up and down along the support post 2. The cantilever beam 14 has a width narrower than the interval between the two base plates 1a,1a, and is placed in the space between the base plates 1a,1a to have the top face on the same height as the base plates 1a,1a in its lowest position. A vehicle M is mounted on the base 1 and the cantilever beam 14 under such conditions as seen in FIG. 6. A pair of drive-on-plates 15,16 are perpendicularly attached to the front end and the rear end of the cantilever beam 14, respectively.

Figure 4:
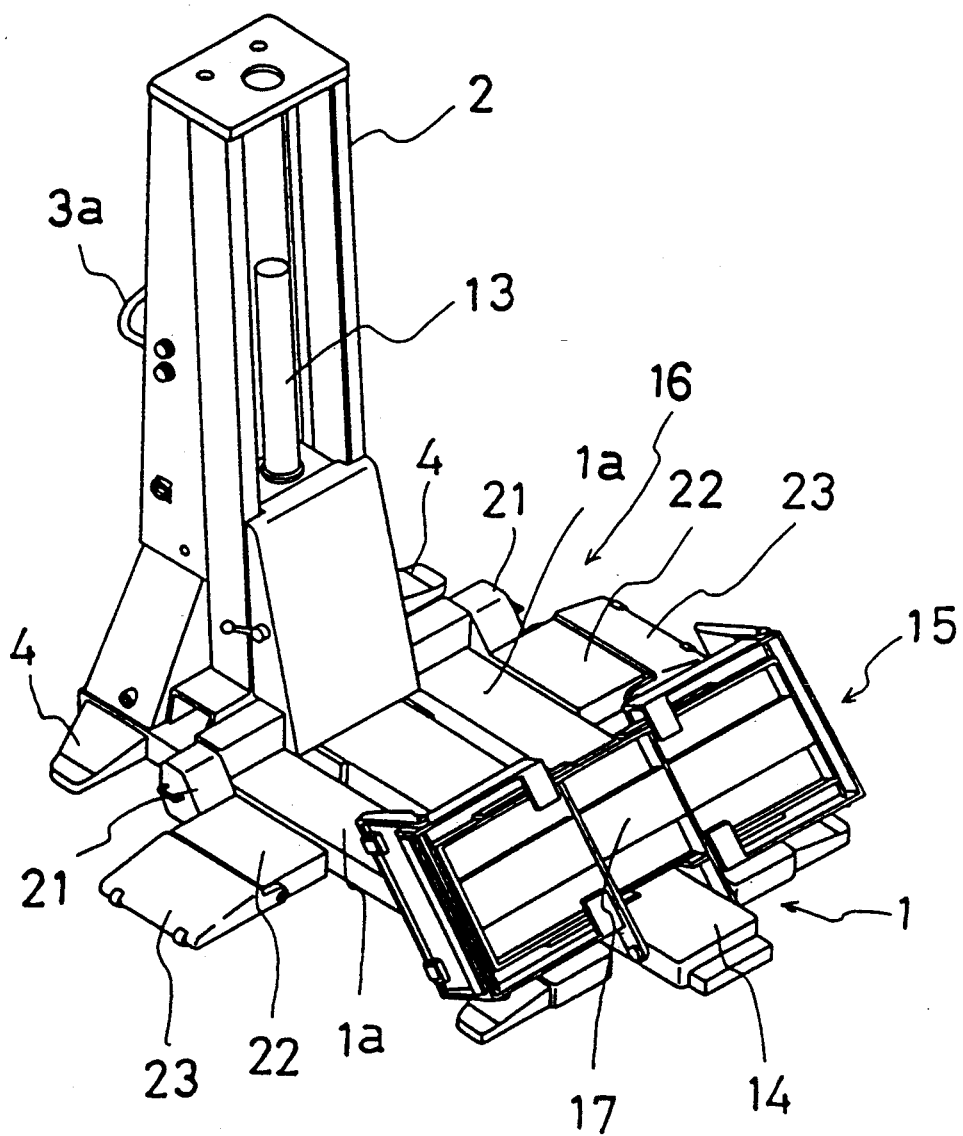
FIG. 4 is a perspective view showing the one-post lift of FIG. 2 with the contracted and folded drive-on-plate.
Figure 5:
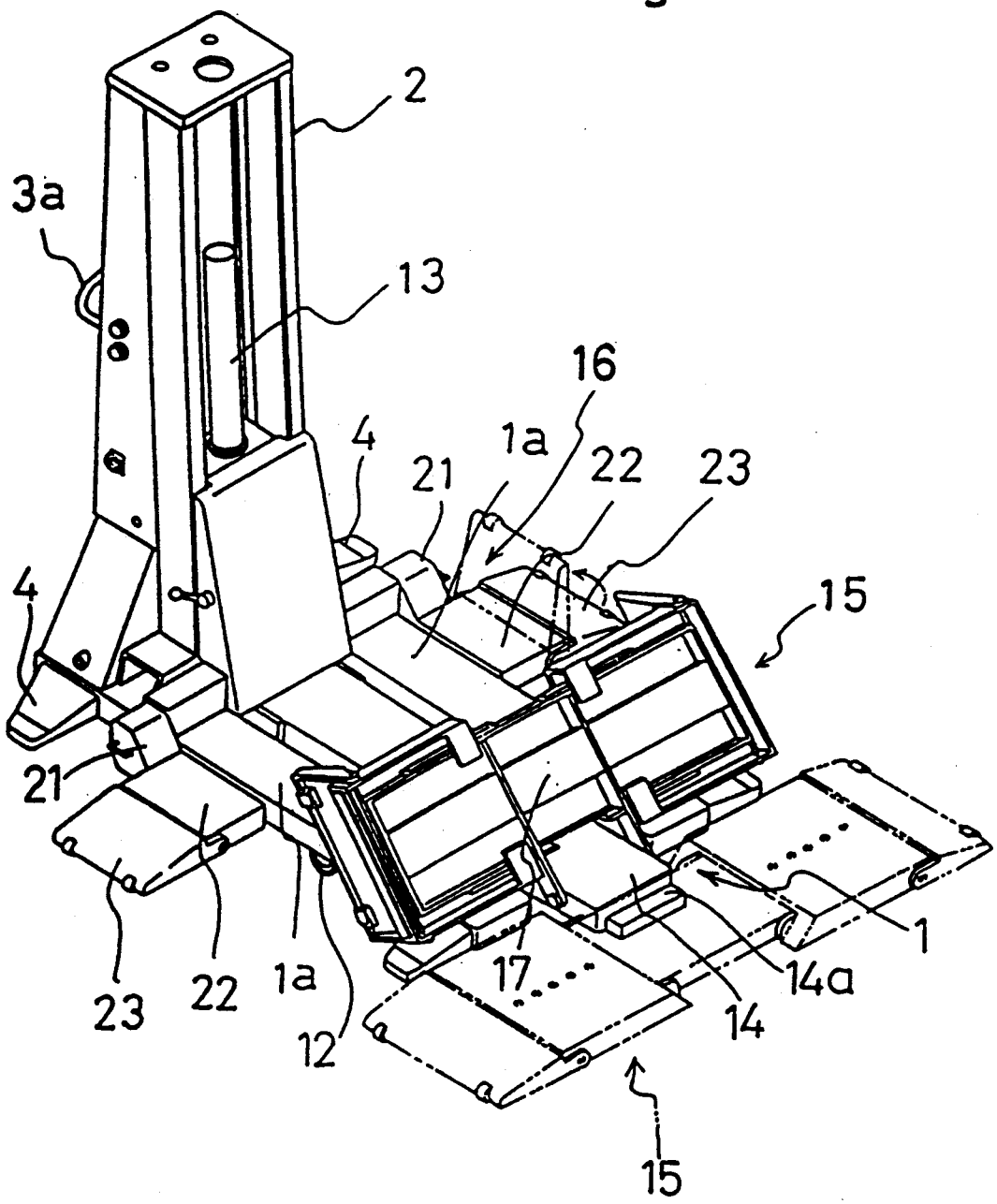
FIG. 5 is a perspective view illustrating the movement of the drive-on-plate.

The front drive-on-plate 15 includes: a support arm 17 disposed to form a T shape with the cantilever beam 14; and mounting plates 18,18 arranged on both ends of the support arm 17. The drive-on-plate 15 is hinged to the front end of the cantilever beam 14 so as to be pivotably rotated upward and folded over the cantilever beam 14 as seen in FIGS. 4 and 5. A stop plate 14a is projected from one end of the cantilever beam 14 to prevent the drive-on-plate 15 from inclining downward from the horizontal level and to ensure stableness of the drive-on-plate 15 in operation. The stop plate 14a may include a shim for adjusting the height.

The rear drive-on-plate 16 includes: a support arm 20 perpendicularly fixed to the cantilever beam 14; and mounting plates 22,22 arranged on both ends of the support arm 20 to face forward. The mounting plates 18,18 of the drive-on-plate 15 are slidable along the support arm 17 while the support arm 20 of the drive-on-plate 16 has an expansion structure in which an inner tube 20b is inserted into an outer tube 20a. Namely, both the drive-on-plates 15 and 16 are adjustable in length. Riding plates in a wedge shape 23,23 are further attached to the mounting plates 18,18 and 22,22.

The riding plates 23,23 are pivotably rotated upward and downward respectively in a range of forty-five degrees against the surface of the mounting plates 18,18 and 22,22. The riding plates 23,23 are moved downward when the drive-on-plates 15,16 are lifted up as shown in FIG. 2, and are moved upward when the drive-on-plate 15 is folded over the cantilever beam 14 as shown in FIG. 5. When the cantilever beam 14 is moved down to its lowest position, the riding plates 23,23 are placed on the floor together with the drive-on-plates 15,16.

Figure 7:
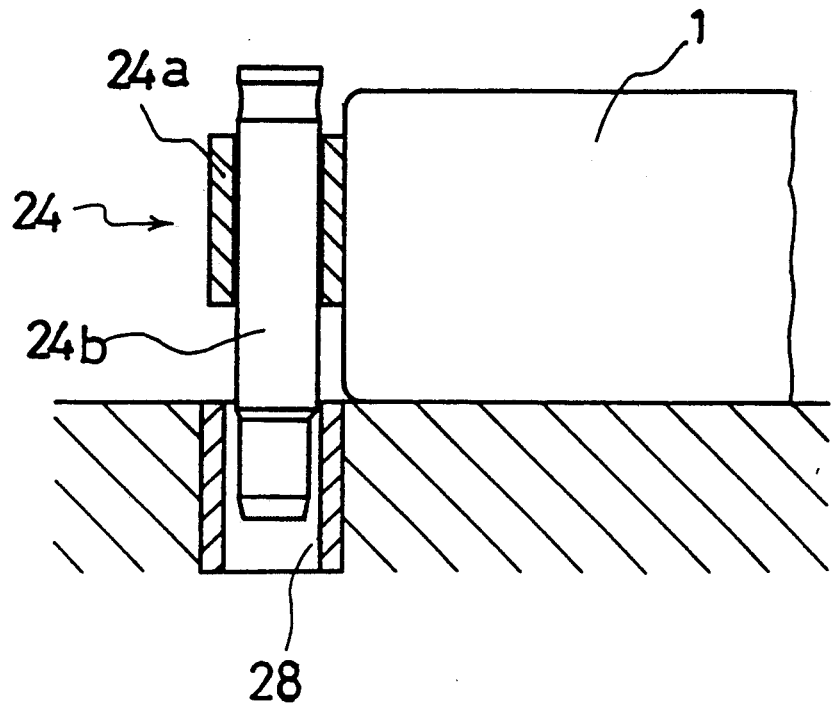
FIG. 7 is an explanatory view showing a structure of a stopper fixed to the base of the lift.

As shown in FIG. 1, a stopper 24 is mounted on each side of the rear end of the base 1. The stopper 24 includes: a vertically extending casing 24a fixed to the side of the rear face of the base 1; and a rod 24b passing through the casing 24a as clearly seen in FIG. 7. The base 1 is fixed at a predetermined position on the floor by inserting the rod 24b of the stopper 24 into a fixing aperture 28 previously formed at the predetermined position.

The lift thus constructed is transported to a predetermined location by operating the pumping handle 3a and drawing down the driving wheels 9,9 and the driven wheels 12,12. At the predetermined location, the transport wheels 9,9 and 12,12 are drawn up, and the base 1 is directly brought into contact with the floor and further fixed with the stoppers 24 for enhanced stability.

The stoppers 24 prevent the whole lift from undesirably moving or shifting due to large force applied to the drive-on-plates 15,16 on mounting the vehicle M.

Figure 11:
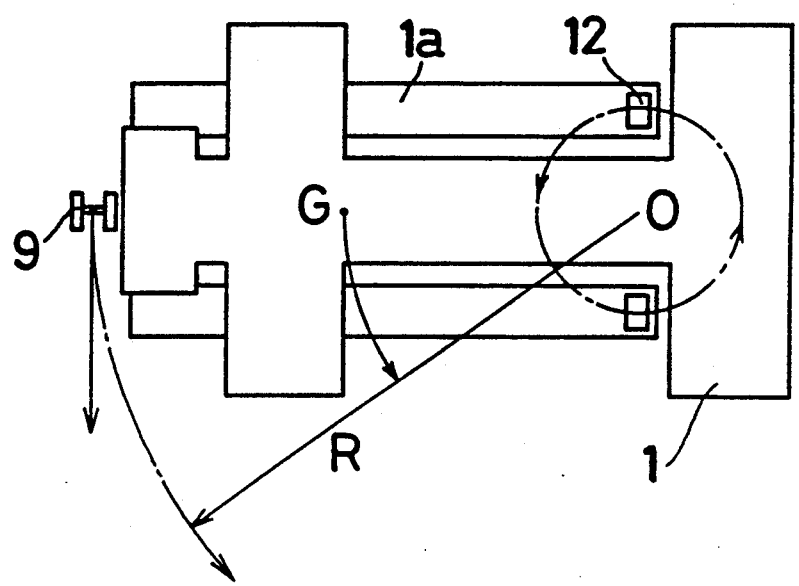
FIG. 11 is a plan view showing structure of a prior art lift.
Figure 12:
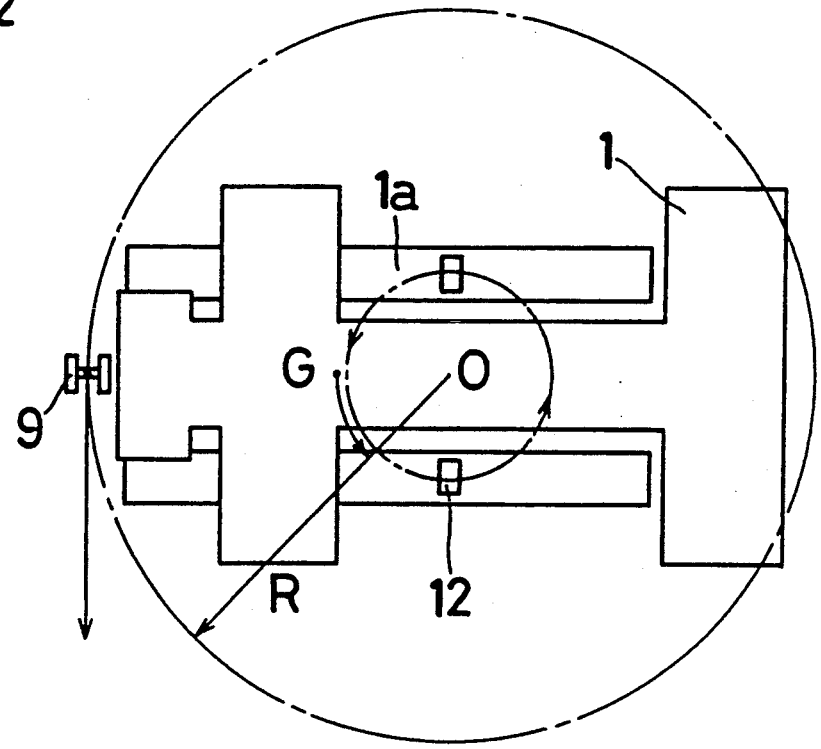
FIG. 12 is a plan view showing the structure of the lift according to the invention.

The lift of the embodiment includes the transport wheels or the driven wheels 12,12 located on the longitudinal center of the base plates 1a,1a as shown in FIG. 12, thus enhancing stability in transportation and reducing the radius of gyration in contrast with the conventional structure shown in FIG. 11. Hydraulic pressure is used in the mechanism drawing up and down the transport wheels, thus allowing transport of the lift with the vehicle thereof.

The drive-on-plates 15,16 are extended to the maximum length to form a substantially integral plane with the base plates 1a,1a in operation. The drive-on-plates 15 and 16 are contracted to the minimum length, and the plate 15 is further folded over the cantilever beam 14, thus saving the storage space.

Figure 13:
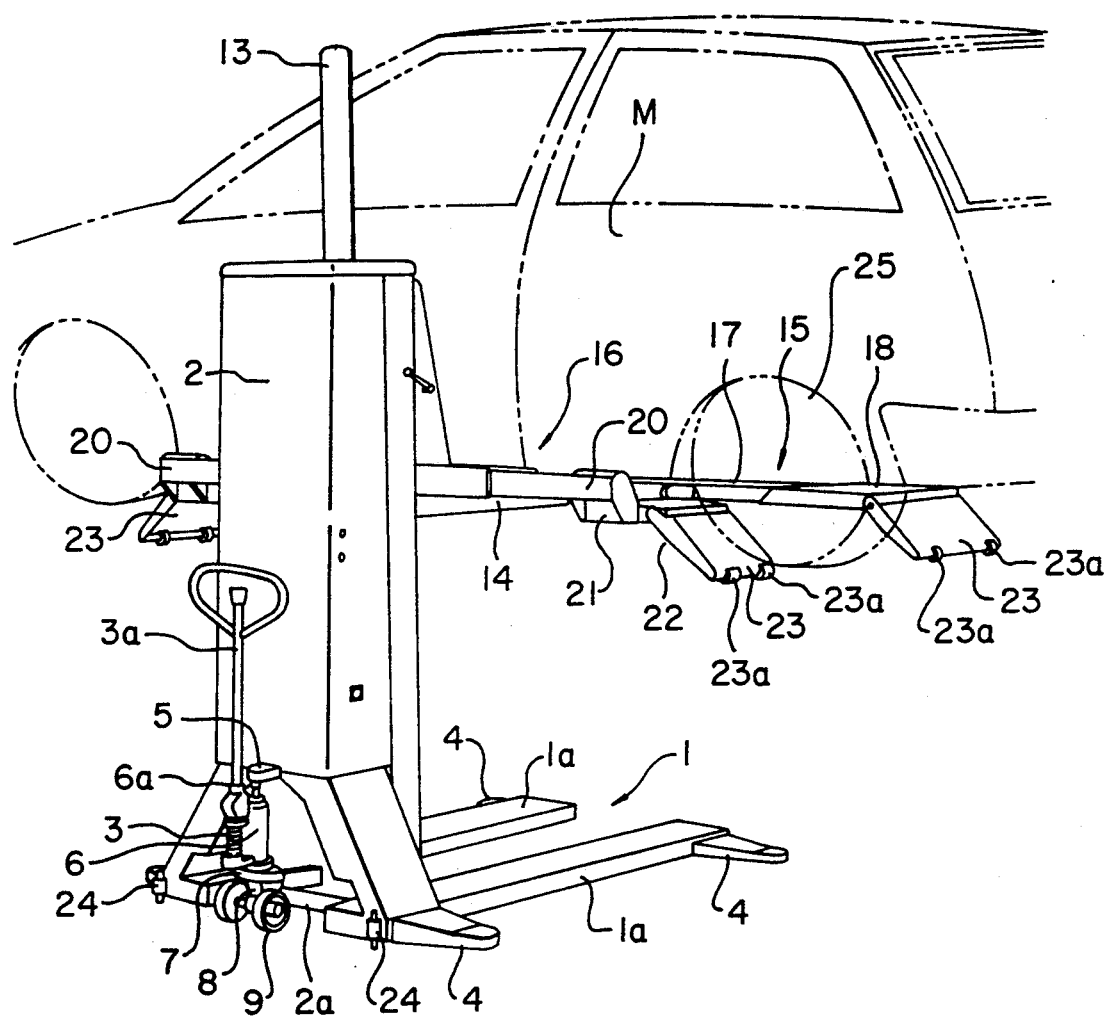
FIG. 13 is a perspective view showing a lift-up vehicle with the lift of the invention.
Figure 14:
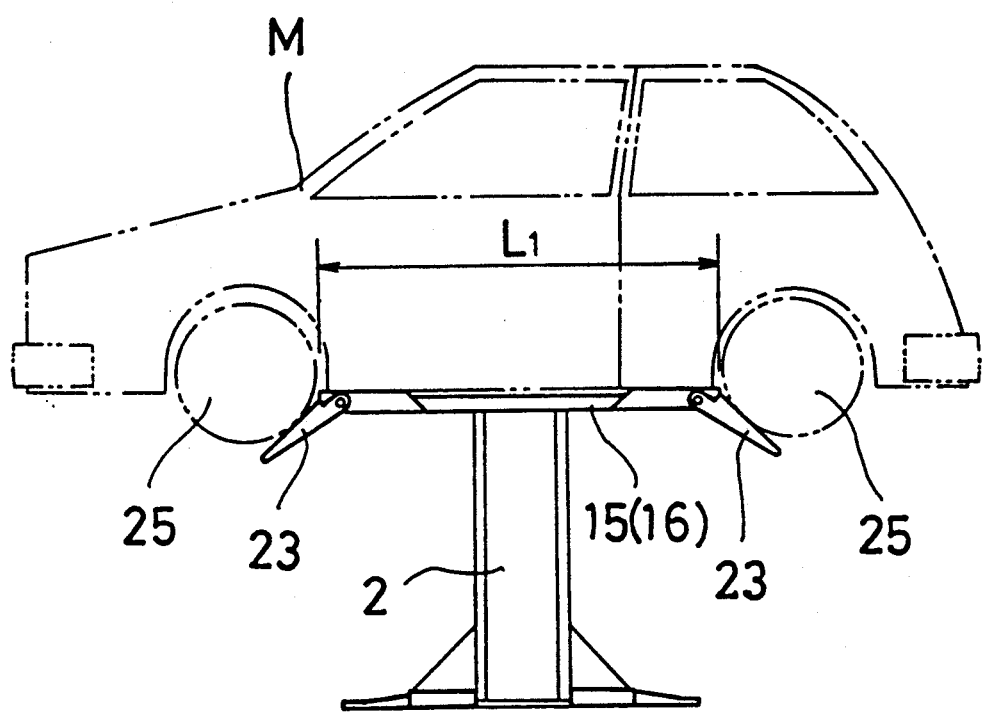
FIG. 14 is an explanatory view illustrating an effective length of the drive-on-plate when a vehicle is lifted up with the lift according to the invention.
Figure 15A:
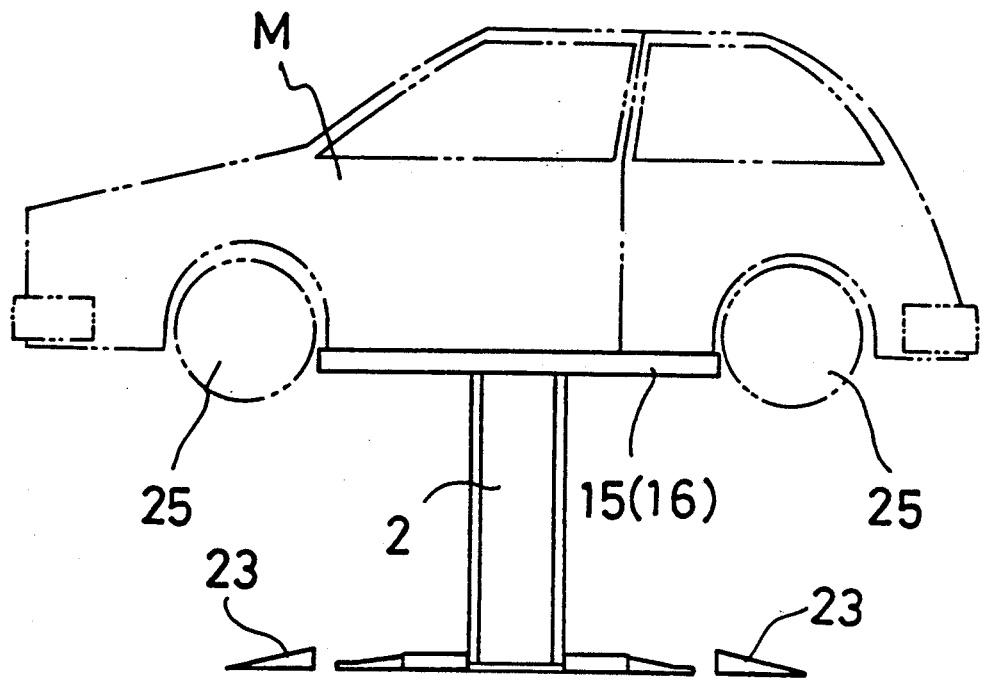
FIG. 15A is an explanatory view showing a typical example of prior art with separate riding plates.
Figure 15B:
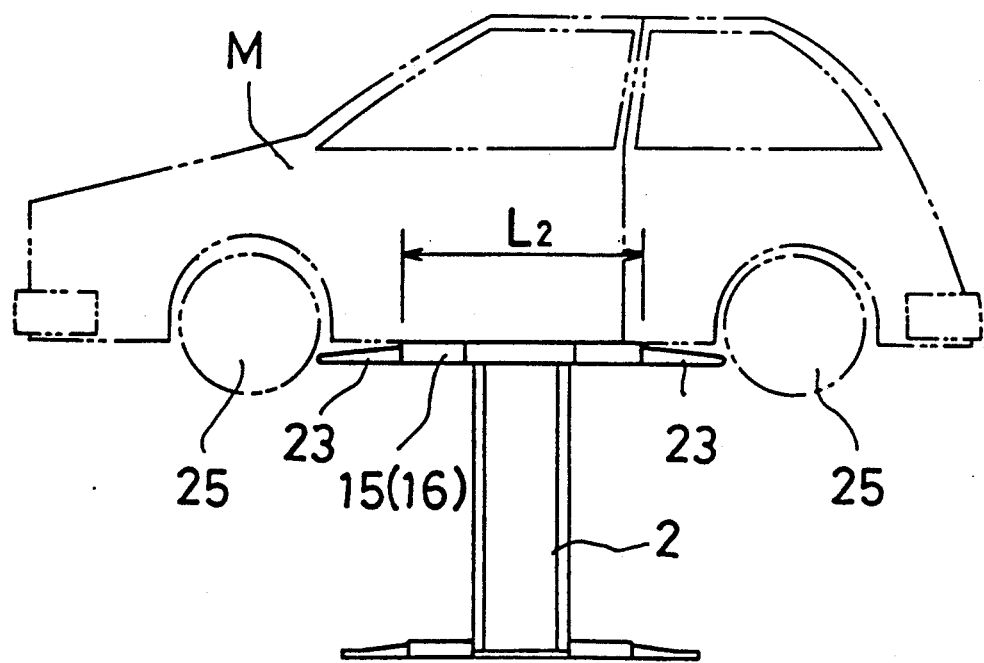
FIG. 15B is an explanatory view showing another structure of prior art with fixed riding plates.
Figure 16:
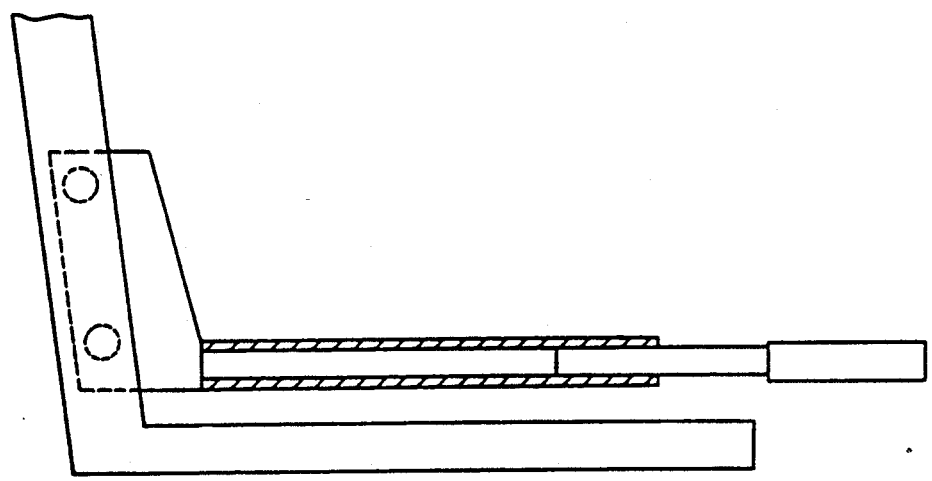
FIG. 16 is a side view illustrating a prior art structure with an adjustable cantilever beam.

While the lift is in its lowest position, wheels 25 of the vehicle M are smoothly mounted on the mounting plates 18,18 and 22,22 of the drive-on-plates 15,16 which make an integral face with the base plates 1a,1a. The riding plates 23 are rotated downward not to hinder the wheels 25 when the vehicle M is lifted up as shown in FIG. 13. Accordingly, an effective length L1 of the drive-on-plate 15(16) is extended to the value corresponding to the interval between the wheels 25 of the vehicle M as seen in FIG. 14.

One end of each riding plate 23 is provided with a pair of rollers 23a,23a shown in FIG. 2 for smooth sliding of the riding plate 23 against the floor.

The invention is not limited to the embodiment described above, and there may be many modifications and changes without departing from the spirit of the invention.

Figure 8:
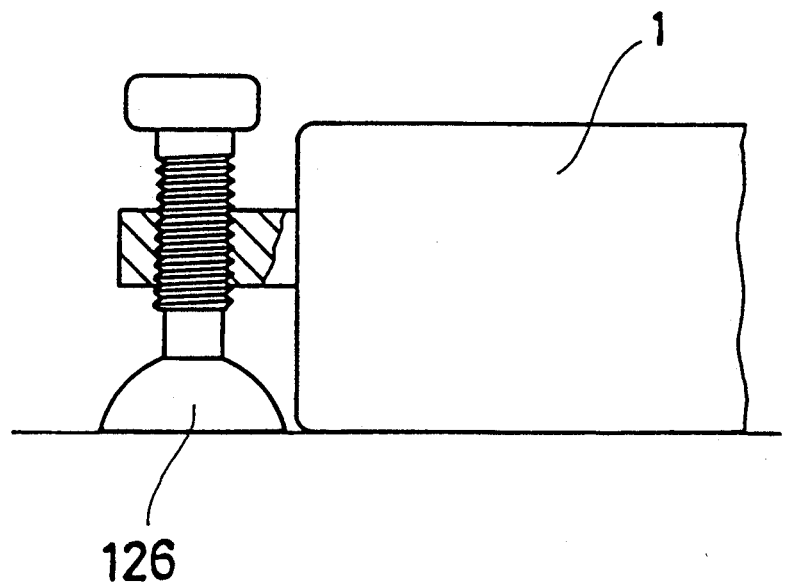
FIG. 8 is an explanatory view showing another structure of the stopper.

For example, the moving angle of the riding plate 23 is not limited to ninety degrees but may be any desirable value. The stopper may have: a coil spring for applying downward force to the rod; a screw rod; or an absorption device 126 shown in FIG. 8, in place of the fixing structure of FIG. 7. The drive-on-plates may also have any desirable structure and folding mechanism.

Figure 10:
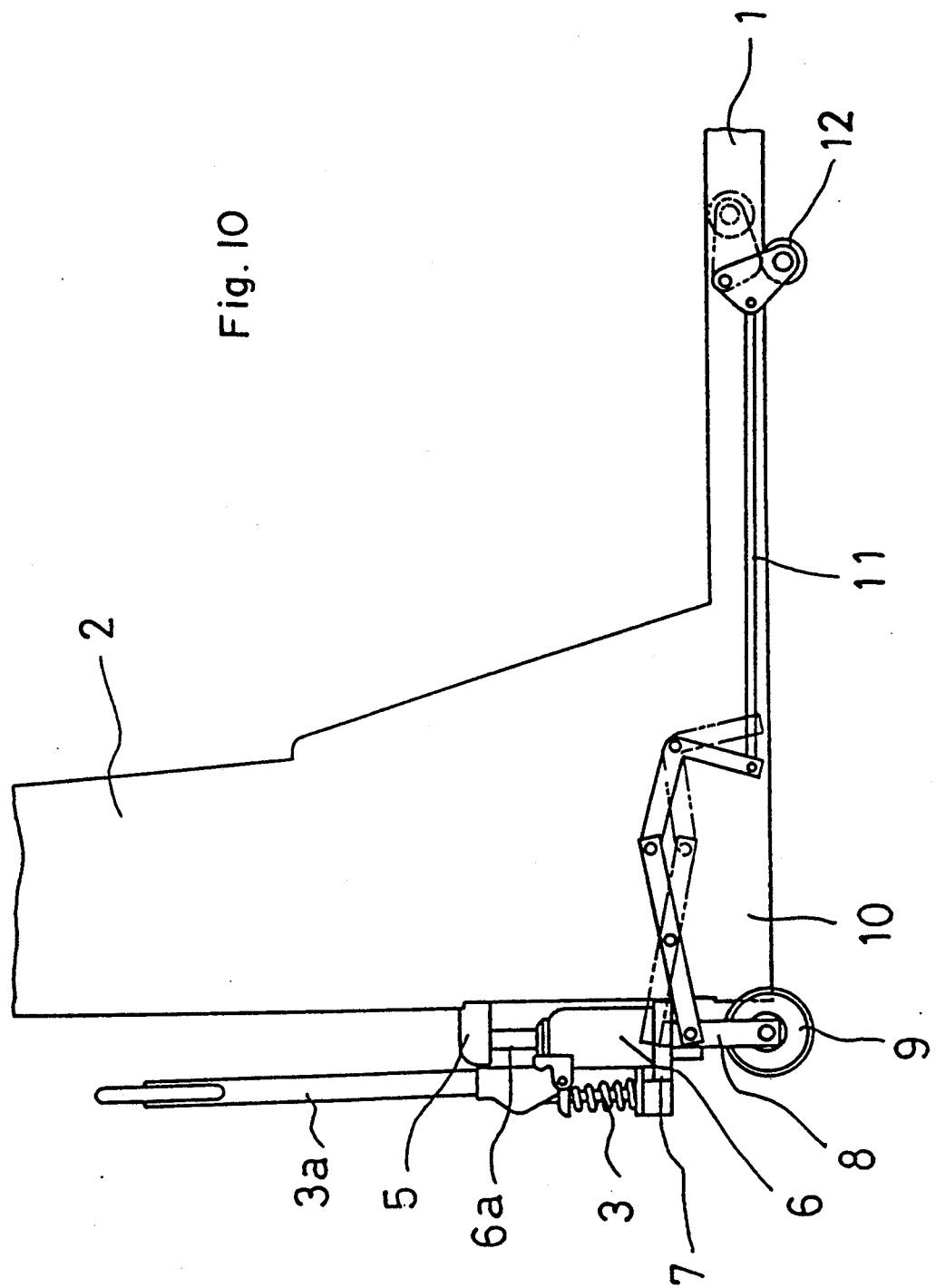
FIG. 10 is a side view showing another mechanism of the transport wheels.

In the above embodiment, when the pumping handle 3a of the hydraulic pump 3 is operated, operating fluid is fed into the cylinder unit 6. Here the piston rod 6a is pressed upward, and in response to the movement of the piston rod 6a, the link 10 pushes the operation rod 11 against the driven wheels 12,12, which are pressed lower than the base level as shown by the solid line of FIG. 9. The driven wheels 12,12 are, on the contrary, drawn up by pulling the operation rod 11 via the link 10 as shown by the doted line of FIG. 9. Another link mechanism may also be applicable as long as the driving wheel and driven wheel are linked to each other. For example, the driven wheel 12 is pulled by the operation rod 11 to go down the base level and is pressed by the operation rod 11 to go up as shown in FIG. 10.

The system of the embodiment is applicable to movable two-post and four-post types and stationary lifts as well as the movable one-post lift.

As described above, the lift of the invention does not take too much space in operation, transport, and storage and is thus favorably applicable to car maintenance in limited space such as a garage for personal use. The stoppers prevent the lift from undesirably shifting due to the load on vehicle mounting and securely fix the lift at the predetermined position on the floor.

In the lift of free wheel structure described above, the effective length of the drive-on-plate, that is, the length in contact with the body of the vehicle, can be extended to the value corresponding to the interval between wheels of the vehicle since the riding plates are pivotably rotated not to hinder the wheels. The system of the invention ensures secure support of the vehicle during maintenance, which is especially suitable for the movable one-post lift.

What is claimed is:

1. A movable one-post lift used for maintenance of a vehicle, said lift comprising:
   a base with transport wheels which are drawn up to and taken out of the base;
   an upright support post mounted on the rear end of the base;
   a driving mechanism disposed in the support post;
   a cantilever beam ascending and descending along the support post by the driving mechanism;

a drive-on-plate fixed to the cantilever beam for supporting the body of the vehicle; and a stopper attached to a suitable position of the base for fixing the base at a predetermined location on the floor, wherein the drive-on-plate comprises front and rear plates being arranged in parallel with each other and perpendicular to the cantilever beam, and wherein the front plate is connected to the cantilever beam to form the shape of a letter T and is foldable over the cantilever beam.

2. A movable one-post lift in accordance with claim 1, wherein the length of each drive-on-plate is adjustable.

3. A movable one-post lift in accordance with claim 1, further comprising riding plates which are connected to both ends of the drive-on-plate and pivotally moved downward when the drive-on-plate is lifted up from floor level.

4. A movable one-post lift used for maintenance of a vehicle comprising:

an upright support post mounted on the rear end of a base;

a driving mechanism disposed in the support post;

a cantilever beam ascending and descending along the support post by the driving mechanism;

a drive-on-plate fixed to the cantilever beam for supporting the body of the vehicle;

a pair of horizontally rotatable driving wheels disposed on the center of the rear end of the base;

a hydraulic elevation mechanism directly connected to the driving wheels; and a pair of driven wheels disposed on the approximate center of the base to interlock with the driving wheels.

5. A movable one-post lift in accordance with claim 4, in which the drive-on-plate comprises front and rear plates being arranged in parallel with each other and perpendicular to the cantilever beam.

6. A movable one-post lift in accordance with claim 5, wherein the length of each drive-on-plate is adjustable.

7. A movable one-post lift in accordance with claim 5, wherein the front plate is connected to the cantilever beam to from the shape of a letter T and is foldable over the cantilever beam.

8. A movable one-post lift in accordance with claim 4, further comprising riding plates which are connected to both ends of the drive-on-plate and pivotally mounted downward when the drive-on-plate is lifted up from the floor level.

9. A movable one-post lift used for maintenance of a vehicle, said lift comprising:

a base with transport wheels which are drawn up to and taken out of the base;

an upright support post mounted on the rear end of the base;

a driving mechanism disposed in the support post;

a cantilever beam ascending and descending along the support post by the driving mechanism;

a pair of parallel drive-on-plates fixed to the cantilever beam for supporting the body of the vehicle;

wherein one of the drive-on-plates is connected to the cantilever beam to form the shape of a letter T and is foldable over the cantilever beam.

10. A movable one-post lift in accordance with claim 9, wherein the length of each drive-on-plate is adjustable.

11. A movable one-post lift used for maintenance of a vehicle comprising:

a base with transport wheels which are drawn up to and taken out of the base;

an upright support post mounted on the rear end of the base;

a driving mechanism disposed in the support post;

a cantilever beam ascending and descending along the support post by the driving mechanism;

a drive-on-plate fixed to the cantilever beam for directly supporting the body of the vehicle; and riding plates connected to both ends of the drive-on-plate and pivotally moved downward when the drive-on-plate is lifted up from the floor level to allow the body of the vehicle to directly rest on the drive-on-plate.

12. A one-post lift used for maintenance of a vehicle, comprising:

an elevation mechanism for ascending and descending between a floor level and a predetermined height;

a drive-on-plate for directly supporting the body of a vehicle; and riding plates being connected to both ends of the drive-on-plate and pivotally mounted downward when the drive-on-plate is lifted up from the floor level to allow the body of the vehicle to directly rest on the drive-on plate.

* * * * *